(12) United States Patent
Copstein et al.

(10) Patent No.: US 7,685,468 B2
(45) Date of Patent: Mar. 23, 2010

(54) METHOD AND SYSTEM FOR TEST CASE GENERATION

(75) Inventors: Bernardo Copstein, Porto Alegre (BR); Flavio Modeira De Oliveira, Porto Alegre (BR); Lucas Rosa Cruz Reginato, Porto Alegre (BR); Andre Gobbi Farina, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 11/630,700

(22) PCT Filed: Jun. 30, 2005

(86) PCT No.: PCT/US2005/023735

§ 371 (c)(1),
(2), (4) Date: Aug. 15, 2007

(87) PCT Pub. No.: WO2006/007588

PCT Pub. Date: Jan. 19, 2006

(65) Prior Publication Data

US 2008/0294941 A1     Nov. 27, 2008

(30) Foreign Application Priority Data

Jul. 1, 2004     (GB) .................................. 0414742.7

(51) Int. Cl.
*G06F 11/00* (2006.01)
(52) U.S. Cl. ........................................................ 714/32
(58) Field of Classification Search ............. 714/26–33, 714/37–41
See application file for complete search history.

(56) References Cited

U.S. PATENT DOCUMENTS

| 5,375,074 | A |   | 12/1994 | Greenberg et al. ........... 364/578 |
| 5,483,470 | A |   | 1/1996  | Alur et al. .................... 364/578 |
| 5,555,415 | A | * | 9/1996  | Allen .......................... 719/318 |
| 5,768,498 | A | * | 6/1998  | Boigelot et al. ............... 714/39 |
| 6,307,546 | B1 | * | 10/2001 | Wickham et al. ............ 715/771 |

(Continued)

OTHER PUBLICATIONS

Brenner, L., et al., "An analytical Model to Evaluate the Performance of Cluster Architectures", LCI International Conference on Linux Clusters 2002, Linux Cluster Institute/NCSA, vol. 1, p. 1-12.

(Continued)

*Primary Examiner*—Nadeem Iqbal

(57) ABSTRACT

A method and apparatus is described for generating a test case for an application or system modelled using a Stochastic Automata Network model. The method contemplates the inclusion of a plurality of automata and including the steps of: (a) setting an initial global state as the current global state, wherein a global state comprises a set of local states each corresponding to one of the automata; (b) creating a record of the initial global state; (c) selecting an event from a set of events that can be applied to the current global state; creating record of the selected event; (e) identifying those of the automata affected by the selected event and updating the current global state by updating the states of the affected automata; (f) creating a record of the current global state; and repeating steps (c) to (f) until a termination condition is satisfied. The invention may also be used for the generation of test scripts. In terms of specific usage case, the invention may be used for software reliability testing and for fault-tolerance measurements.

24 Claims, 5 Drawing Sheets

U.S. PATENT DOCUMENTS

| | | | |
|---|---|---|---|
| 6,516,306 B1 * | 2/2003 | Alur et al. | 706/10 |
| 6,941,557 B1 * | 9/2005 | Jakobson et al. | 719/316 |
| 2003/0126506 A1 | 7/2003 | Lin | 714/38 |
| 2005/0132039 A1 * | 6/2005 | Hartung | 709/223 |

OTHER PUBLICATIONS

Bertolini, C., et al., Test Case Generation Using Stochastic Automata Networks: Quantitative Analysis, Second International Conference on Software Engineering and Formal Methods, pp. 251-260 (2004).

Hessel, A., et al., "Time-Optimal Real Time Test Case Generation Using UPPAAL", Fates '03, Montreal (Oct. 2003).

Kallepalli, C, et al., "Measuring and Modeling Usage and Reliability for Statistical Web Testing", IEEE Transactions on Software Engineering, vol. 27, No. 11 (Nov. 2001).

Trammell, C., et al., "Quantifying the reliability of Software: Statistical Testing Based on a Usage Model", IEEE, pp. 208-218 (1995).

* cited by examiner

Figure 1　　　　　　　　PRIOR ART

METHOD AND SYSTEM FOR TEST CASE GENERATION

FIELD OF THE INVENTION

The invention relates to test case generation. In particular, the invention relates to generating test cases for testing of computer applications.

BACKGROUND OF THE INVENTION

The interest in statistical testing has increased in recent years for two main reasons: the growing complexity and non-determinism of the environments in which modern software is expected to operate (the Internet being the most popular example) and the higher levels of reliability required for some applications. Indeed, reliability assessment is crucial for systems with safety and fault-tolerance requirements. Such demands are difficult to address with traditional testing techniques. The complexity of the software itself and its interface may require that a test engineer develop test cases from a complex model describing the application. The use of automated tools is inevitable as such applications are simply too complex to test using manual tests.

This poses further problems: how to create test scripts with hundreds or thousands of tests in an effective way and how to update such scripts efficiently when there is a change in the product.

A usage model characterises the operational use of a software system, where the software is used in a specific environment and the user may be a person, a hardware device, other software, or a group of users. A software use may be a working session, transaction or any service unit limited by start and finish events.

The model structure is composed of a state set and the transitions between the states, constituting a graph. The graph nodes represent the model states, and the graph arcs represent transitions between states. The structure describes the possible uses of the software. A probability distribution associated with the model describes the expected use of the software.

Statistical testing with usage models is mostly based in Markov chains. However, a Markov chain for a complex application can easily reach hundreds or thousands of states, making modelling and maintenance a difficult task. Moreover, in order to generate the test script, it is necessary to add implementation related information to the usage model.

Accounts of usage models based on Markov chains are given by Tramell [Trammell, C. "Quantifying the Reliability of Software: Statistical Testing Based on a Usage Model," 208-218. *Proceedings of the Second IEEE International Symposium on Software Engineering Standards*. Montreal, Quebec, Canada, August 21-25, 1995.] and Kallepalli [C. Kallepalli and J. Tian, "Measuring and Modeling Usage and Reliability for Statistical Web Testing", *IEEE Trans. on Software Engineering*, Vol. 27, No. 11, pp. 1023-1036, November, 2001.].

A simple Markov chain usage model is shown in FIG. 1. The system has four states, Start, Error Message, Menu and Termination. From the 'Start' state, a user enters a password. If the password is incorrect, the Error Message is displayed. This occurs with a probability of 0.2. From the Error Message, the system always reverts to Start. If the password is correct, the system proceeds to the Menu state. This occurs with a probability of 0.8. From the menu the user can only terminate the program.

The evolution of the system is represented by transitions from one state to another and these transitions are assumed to happen in an instantaneous way.

The probabilities of transition of Markov chains are often represented by matrices. A transition matrix for the system of FIG. 1 is shown in Table 1 below.

TABLE 1

|  | Start | Error Message | Menu | Termination |
| --- | --- | --- | --- | --- |
| Start | 0 | 0.2 | 0.8 | 0 |
| Error Message | 1 | 0 | 0 | 0 |
| Menu | 0 | 0 | 0 | 1 |
| Termination | 1 | 0 | 0 | 0 |

In general, the time and memory worst-case complexity of test case generation with a Markov chain usage model is proportional to the size of the transition matrix used to represent the model, i.e. proportional to the square of the number of states. This number grows very fast with the number of states.

A SAN consists of a number of individual stochastic automata that operate in a somewhat independent way.[1] Each automaton is represented by a certain number of states, along with rules or probability functions that rule the movements from one state of the automaton to another. The state of the automata network is determined by the states that each one of the constituent automata occupies at a time t.

[1] A. G. Farina, F. M. Oliveira. Research Report no. 23, CPPGCC-PUCRS, Porto Alegre, Brazil, March 2002.

More formally, given a set S of states (local states), let $A=\{A_1, A_2, \ldots A_n\}$ be a set of automata, wherein each automaton $A_i$ is a subset of S. Then a SAN is a structure (G, E, Pe, Pt, I), where:

$G=\{G_1, G_2, \ldots G_m\}$ is a set of global states, such that each $G_i$ is an element of $A_1 \times A_2 \times \ldots \times A_n$. In other words, each global state is a combination of local states of the automata.

$E=\{E_1, E_2, E_k\}$ is a set of events. Each event is a function $E_i: G \rightarrow P(G)$. In other words, each event maps global states into sets of global states. When the event is applied, the SAN can go to any element of the set specified by the function, depending on the probabilities assigned to the event. Since a global state is a list of local states, the function describes for each automaton in the network what happens in that automaton when the event is fired. Events can be classified as local or synchronising. A local events changes the state of only one automaton; a synchronising event changes the states of two or more automata.

$Pe=\{P_1, P_2, \ldots P_k\}$ is a set of event probability functions, one for each event. Each function $P_i: G \rightarrow R$ describes the probability of occurrence of the event at each global state.

$Pt=\{Pt_1, Pt_2, \ldots Pt_{km}\}$ is a (possibly empty) set of transition probability functions, one for each pair (event, global state). As described above, when a SAN is in a global state S and an event i is applied, the SAN goes to a state S', which must be an element of Ei(S). The transition probability functions describe the probabilities of the different elements of Ei(S) being selected. Usually Ei(S) has only one state, in which case these probabilities are not required.

I is a set of initial global states, so is a subset of G. In some definitions, SANs do not have initial states, hence the set I may be empty.

It can be shown that SANs have a number of advantages over Markov chains in modelling complex systems. However, SANs have not yet been applied in testing systems or test case generation.

SUMMARY OF THE INVENTION

In a first aspect the invention provides a method of generating a test case for an application modelled using a Stochastic Automata Network model including a plurality of automata, including the steps of:

a) setting an initial global state as the current global state, wherein a global state comprises a set of local states each corresponding to one of the automata;

b) creating a record of the initial global state;

c) selecting an event from a set of events that can be applied to the current global state;

d) creating a record of the selected event;

e) identifying those of the automata affected by the selected event and updating the current global state by updating the states of the affected automata;

f) creating a record of the current global state; and repeating steps c) to f) until a termination condition is satisfied.

In a second aspect the invention provides a method of generating a predetermined number of test cases, including:

g) determining a target number of test cases;

h) generating a test case by the method described above; and j) repeating step h) until the target number of test cases is reached.

In a third aspect the invention provides a method of generating a test case for a system, including:

creating a model of the system using a Stochastic Automata Network; and generating a test case by the method described above.

In a fourth aspect the invention provides an apparatus for generating a test case for an application modelled using a Stochastic Automata Network including a plurality of automata, the apparatus including a processor and memory, the memory being configured to store data related to the Stochastic Automata Network and the processor being configured to:

a) select an initial global state from a set of possible initial global states stored in the memory, each global state comprising a set of local states each corresponding to one of the automata, b) set the selected initial global state as the current global state;

c) store a record of the current global state in the memory;

d) select an event from a set of events that can be applied to the current global state, from a set of possible events stored in the memory;

e) store a record of the selected event in the memory;

f) identify those of the automata affected by the selected event and update the current global state by updating the local states of the affected automata; and g) store a record of the up dated current global state in the memory.

In a fifth aspect the invention provides a testing apparatus including a processor and memory, the memory being configured to store data related to a Stochastic Automata Network based model of an application, the Stochastic Automata Network including a plurality of automata, and the processor being configured to:

a) select an initial global state from a set of possible initial global states stored in the memory, each global state comprising a set of local states ea ch corresponding to one of the automata, b) set the selected initial global state as the current global state;

c) store a record of the current global state in the memory;

d) select an event from a set of events that can be applied to the current global state, from a set of possible events stored in the memory;

e) store a record of the selected event in the memory;

f) identify those of the automata affected by the selected event and update the current global state by updating the local states of the affected automata; and g) store a record of the updated current global state in the memory.

BRIEF DESCRIPTION OF THE DRAWINGS

The invention will now be described by way of example with reference to the accompanying drawings, in which:

FIG. 3b shows a SAN-based model of the application of FIG. 3a;

DESCRIPTION OF THE INVENTION

A usage model based on a Stochastic Automata Network (SAN) is a data structure composed of a list of automata and a list of events.

Where a model is described in relation to an application or system, this means a model of any part of or the whole of the application or system.

In the list of automata, each automaton has a list of its respective local states. Each state has a list of pointers to its possible events and the transitions triggered or "fired" by the events. In the list of events, each event has an attribute with its type (local, synchronising, initial, termination). The complexity problem described above in relation to Markov chains is minimised in models using SANs because, instead of the creation of a large transition matrix, one smaller matrix is created for each automaton.

Figure 1:
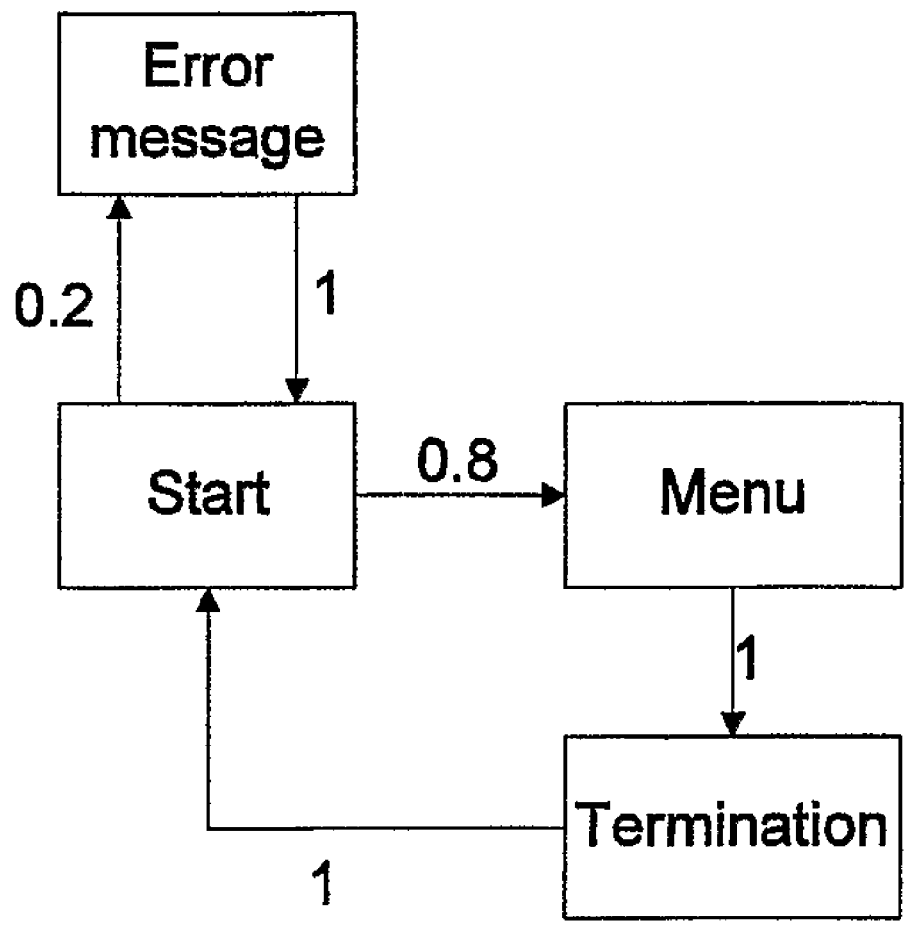
FIG. 1 shows a simple Markov chain.
Figure 2:
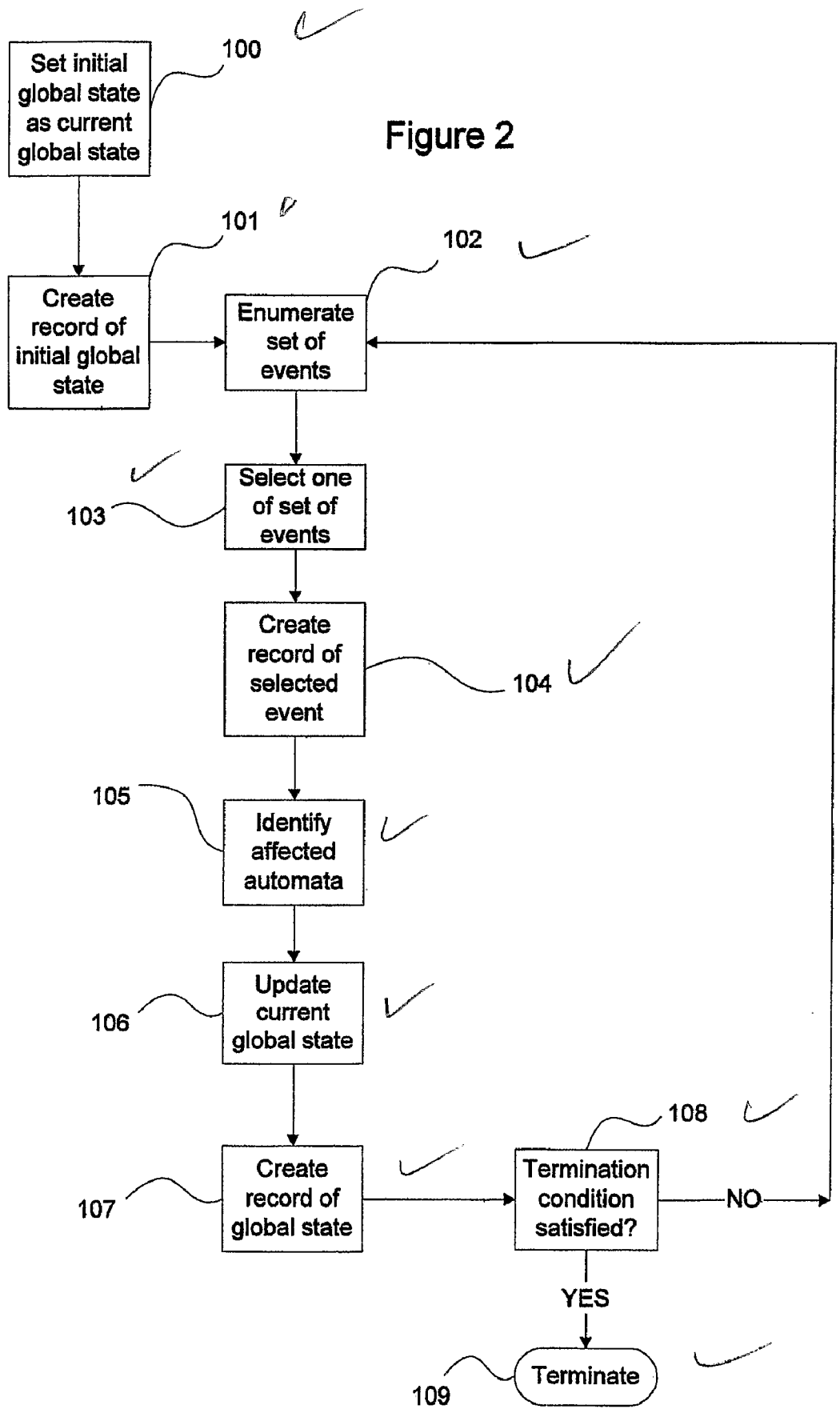
FIG. 2 is a flow chart showing a method of generating a test case according to one embodiment of the invention.

Referring now to FIG. 2, test case generation begins at step 100 with setting of the initial global state. At step 101, a record is created of the initial global state. Records are created at various stages of the test case generation and together form the "test case description".

Where there are a number of possible initial global states, an initial state must be selected from the set of possible initial states. The initial global state may be selected randomly or based on the relative probabilities of the possible initial global states. This step may also include enumerating the set of possible initial states before selecting an initial state. Preferably the step of enumerating the set of possible initial states is performed before test case generation, so that it does not need to be repeated for each test case where many test cases are to be generated for a single application.

At step 102, the set of events that may be applied to the current global state is enumerated by analysing the model and the list of pointers to possible events for each automaton. An event is then chosen from the set at step 103 either randomly or based on the relative probabilities of the events. At step 104 a record is created of the selected event.

At step 105, all automata that are affected by the event are locate d. Firstly it is established whether the event is local or synchronising. If local, then that automaton is the only one affected. If synchronising, then the system looks for all automata affected by the event. The system then computes the next state of each affected automaton, updates the current global state at step 106 by updating the state of each affected automaton and creates a record of the updated global state at step 107.

If a termination condition has been satisfied, the method is terminated at steps 108, 109. Otherwise the method returns to step 102 and continues. A termination condition may be satisfied when a termination event is applied or when a certain number of events or global states have been added to the test case description. Other termination conditions may also be used.

Example 1

Figure 3A:
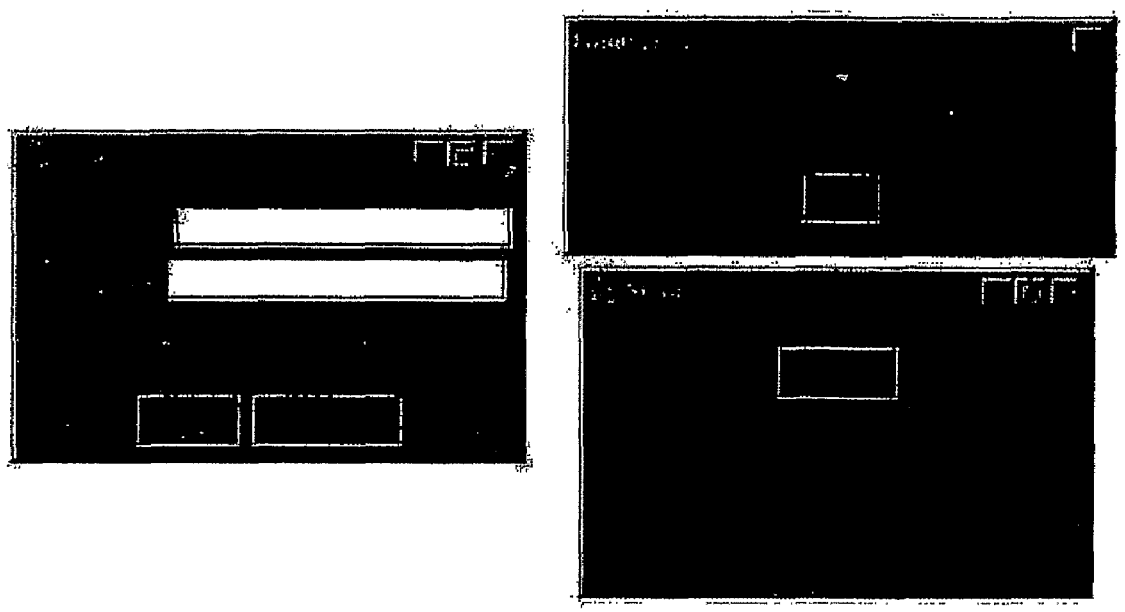
FIG. 3a shows a simple application.
Figure 3B:
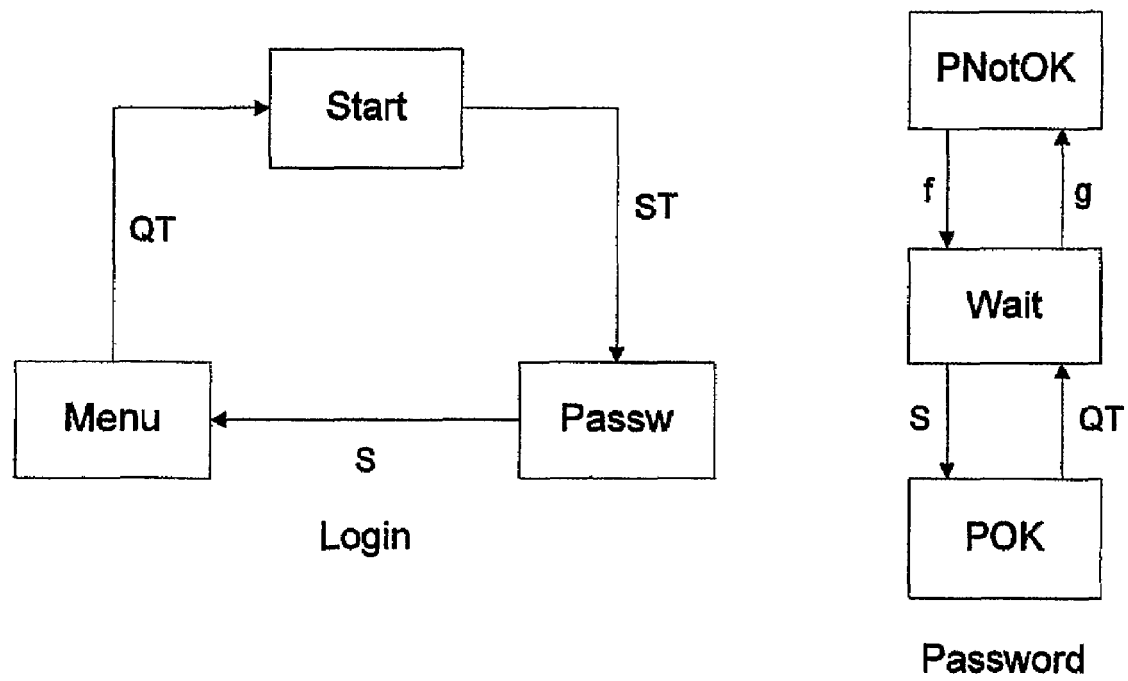

Modelling and test case generation for a simple application will now be described with reference to FIGS. 3a and 3b. The application consists of two dialogues, shown in FIG. 3a. The first is a login dialogue, in which the user is prompted for a username and password. If the user name or password is incorrect, the application issues an error message. If the username and password are correct, the user is passed to the second dialogue which is a menu, where the user can only terminate the application.

The application of FIG. 3 a can be described by the SAN shown in FIG. 3 b with the structure shown in Table 2.

TABLE 2

| Automaton | Local states | Events |
|---|---|---|
| Login | Start (initial) | ST |
| Login | Menu | QT |
| Login | Passw | S |
| Password | Wait (initial) | g, S |
| Password | POK | QT |
| Password | PNotOK | f |

The list of events for the model is:

ST (initial, synchronising, probability=1, transition probability=1)

QT (termination, synchronising, probability=1, transition probability=1)

S (synchronising, probability=0.5, transition probability=1)

f (local, probability=1, transition probability=1)

g (local, probability=0.5, transition probability=1)

Note that the initial and termination events are classified as synchronising, even if they occur in only one automaton.

Thus, the Login automaton consists of the three local states: Start, Passw and Menu. The Password automaton consists of the Wait, POK and PNotOK local states. The set of events E={ST, QT, S, f, g}. The state of an automaton will be indicated by the notation Automaton.State, so the global state of this simple application can be indicated by [Login.State1, Password.State2].

The test case generation method will now be described with reference to this application. It is assumed that there is no termination condition other than the fact that QT is a termination event.

In this example there is only one possible initial global state, [Login.Start, Password.Wait]. As is apparent from Table 2, not all events can be applied to a given global state. In the example, the only event applicable to the global state [Login.Start, Password.Wait] is ST. Event ST, when applied to the two automata, updates the global state to: [Login.Passw, Password. Wait]. As ST is not a termination event, the test case generation continues.

The current global state is now [Login.Passw, Password.Wait]. The set of possible events is {g, S}. One of the events is chosen based on the relative probabilities of the events, say event g. Event g updates the global state to: [Login.Passw, Password.PNotOK]. Event g is not a termination event, so the test case generation continues.

The current global state is now [Login.Passw, Password.PNotOK]. The only possible event is f, which updates the global state to [Login.Passw, Password.Wait]. Event f is not a termination event, so the test case generation continues.

Again, one of the events is chosen based on the relative probabilities of the events, say event S. Event S updates the global state to: [Login.Menu, Password.POK]. S is not a termination event, so the test case generation continues.

The current global state is now [Login.Menu, Password.POK]. The only possible event is QT, which updates the global state to [Login.Start, Password.Wait]. As QT is a termination event, the test case generation is complete.

For this example the test case description would read:

[Login.Start, Password.Wait]

ST

[Login.Passw, Password.Wait]

g

[Login.Passw, Password.PNotOK]

f

[Login.Passw, Password.Wait]

S

[Login.Menu, Password.POK]

QT

[Login.Start, Password.Wait].

Figure 4:
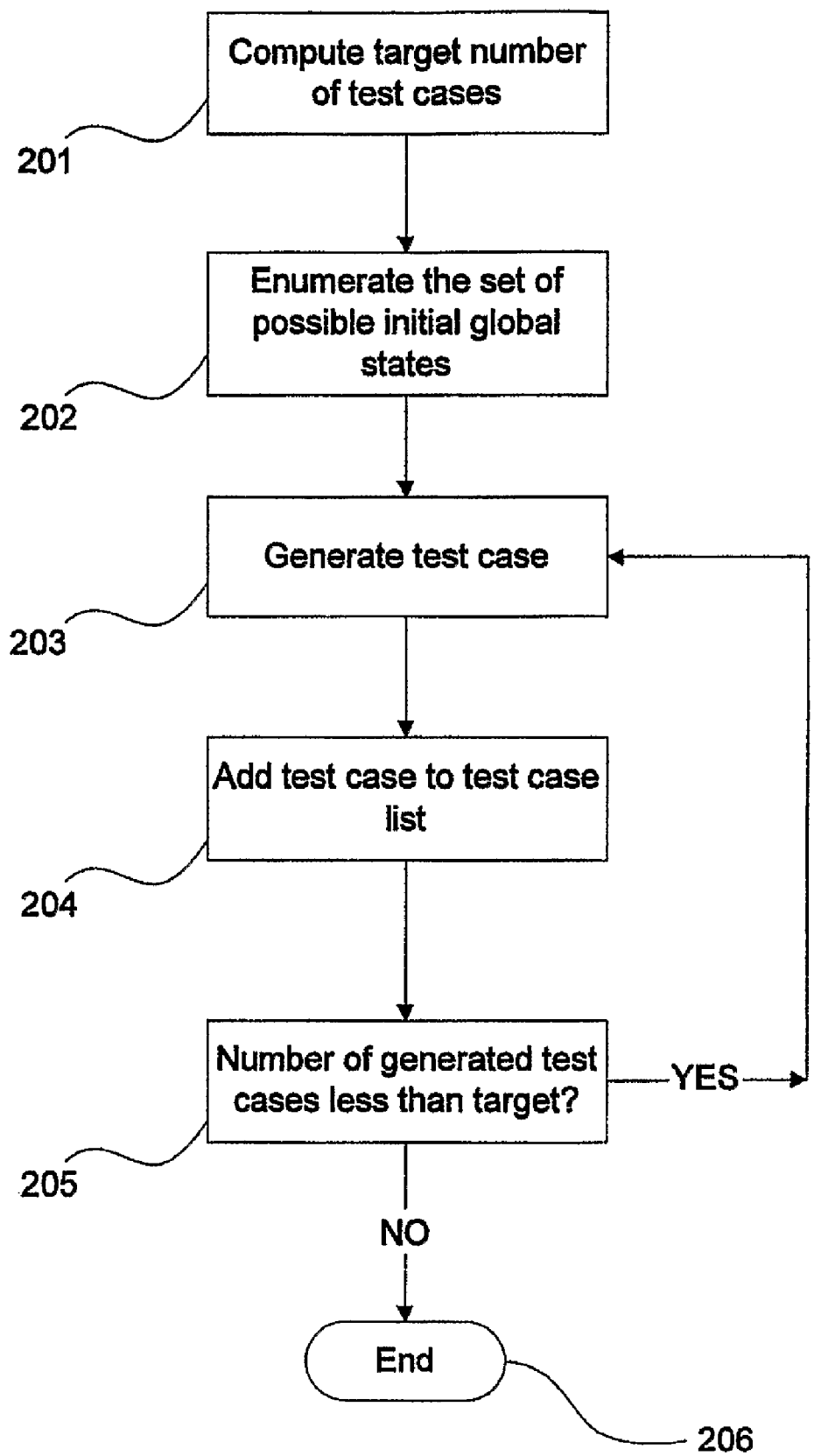
FIG. 4 is a flow chart showing a method of generating a target number of test cases.

FIG. 4 shows a method for generating a target number of test cases. At step 201 the target number of test cases is determined, such that testing will be statistically meaningful.

At step 202 the set of possible initial global states of the application is enumerated. This step is performed by analysing the usage model. At steps 203 and 204 a test ca se is generated by the method illustrated in FIG. 2 and is then added to a list of test cases. Test cases continue to be generated and added to the list until the target number of test cases is reached (step 205), when the method ends (step 206).

Figure 5:
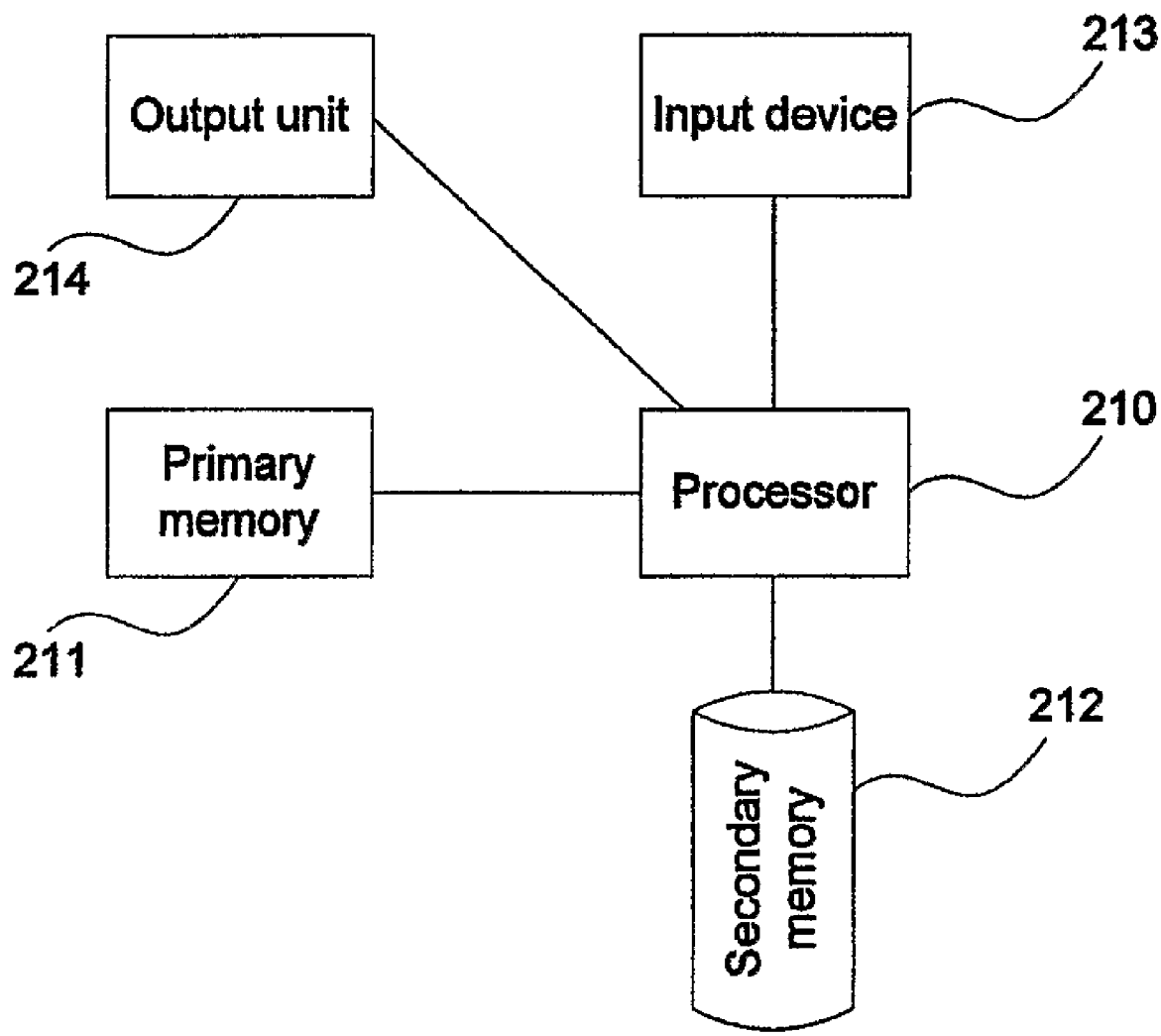
FIG. 5 is a schematic diagram of the testing apparatus of the invention.

FIG. 5 is a schematic drawing of the testing apparatus of the invention. The apparatus includes a processor 210, primary memory 211, secondary memory 212, an input device 213 and an output unit 214. The processor performs the steps described above to generate test cases. The primary and secondary memory stores details of the SAN model, as well as storing records of the global states and events as they are added to the test case description. Once a test case has been generated, the steps in the test case are applied to the application by the testing apparatus. Data may be output from the system at any stage via output unit 214, which may be a screen or printer. In particular, results of the test case generation or the results of a test may be output.

The input device 213 may be a keyboard, mouse or voice recognition device. This allows the user to prompt the testing apparatus to begin test case generation or testing. The input device also allows the user to assist the testing apparatus in preparation of a Stochastic Automata Network based model for an application or system. Once preparation of such a model is complete, it can be stored in primary or secondary memory 211, 212 and testing can be performed using the model.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of generating a test case for an application or system modelled using a Stochastic Automata Network model including a plurality of automata, including the steps of:
   a) setting an initial global state as the current global state (100), wherein a global state comprises a set of local states each corresponding to one of the automata;
   b) creating a record of the initial global state (101);
   c) selecting an event (103) from a set of events that can be applied to the current global state;
   d) creating a record of the selected event (104);
   e) identifying those of the automata affected by the selected event (105) and updating the current global state by updating the states of the affected automata (106);
   f) creating a record of the current global state (107); and
   repeating steps c) to f) until a termination condition is satisfied.

2. A method as claimed in claim 1, wherein step a) comprises selecting an initial global state from a set of possible initial global states.

3. A method as claimed in claim 2, wherein step a) comprises selecting an initial global state from the set of possible initial global states based on the relative probabilities of the possible initial global states.

4. A method as claimed in claim 1, wherein step c) comprises selecting one of the events from the set of events based on the relative probabilities of the events in the set of events.

5. A method as claimed in claim 1, wherein step c) comprises enumerating the set of candidate events (102) that can be applied to the current global state before selecting one of the candidate events.

6. A method as claimed in claim 5, wherein step c) includes calculating the relative probabilities of the events in the set of events and selecting one of the events based on the relative probabilities.

7. A method as claimed in claim 1, wherein step e) includes the following steps:
   e1) determining whether the selected event is local or synchronising;
   e2) if the selected event is local, updating the current global state by updating the state of the affected automaton;
   e3) if the selected candidate event is synchronising, determining those of the automata affected by the selected event, and updating the current global state by updating the states of the affected automata.

8. A method as claimed in claim 1, wherein the record of the initial global state and the records of selected events and current global states together form a test case description.

9. A method as claimed in claim 1, wherein the termination condition is satisfied when the event selected in step d) is a termination event.

10. A method as claimed in claim 1, wherein the termination condition is satisfied when a predetermined number of records have been created in step e).

11. A method as claimed in claim 1, wherein the current global state is updated in step e) according to transition probabilities.

12. A method of generating a predetermined number of test cases, including:
   g) determining a target number of test cases (201);
   h) generating a test case by the method of claim 1; and
   j) repeating step h) until the target number of test cases is reached.

13. A method as claimed in claim 12, including the step of enumerating a set of possible initial global states (202) before step h).

14. A method of generating a test case for an application or system, including:
   creating a model of the application or system using a Stochastic Automata Network; and
   generating a test case by the method of claim 1.

15. A method as claimed in claim 14, wherein environmental requirements are explicit in the model.

16. An apparatus for generating a test case for an application or system, the apparatus including memory (211, 212) and a processor (210), characterised in that the memory (211, 212) is configured to store data related to a Stochastic Automata Network based model of the application or system, the Stochastic Automata Network including a plurality of automata, and in that the processor (210) is configured to:
   a) select an initial global state from a set of possible initial global states stored in the memory (211,212), each global state comprising a set of local states each corresponding to one of the automata,
   b) set the selected initial global state as the current global state;
   c) store a record of the current global state in the memory (211,212);
   d) select an event from a set of events that can be applied to the current global state, from a set of possible events stored in the memory (211,212);
   e) store a record of the selected event in the memory (211, 212);
   f) identify those of the automata affected by the selected event and update the current global state by updating the local states of the affected automata; and
   g) store a record of the updated current global state in the memory (211,212).

17. An apparatus as claimed in claim 16, wherein the processor (210) is configured to perform the operations a) to g) sequentially.

18. An apparatus as claimed in claim 17, wherein the processor (210) is configured to repeat the operations d) to g) until a termination condition is satisfied.

19. A testing apparatus including a processor (210) and memory (211,212), the memory being configured to store data related to a Stochastic Automata Network based model of an application or system, the Stochastic Automata Network including a plurality of automata, and the processor (210) being configured to:
   a) select an initial global state from a set of possible initial global states stored in the memory, each global state comprising a set of local states each corresponding to one of the automata;
   b) set the selected initial global state as the current global state;
   c) store a record of the current global state in the memory (211,212);
   d) select an event from a set of events that can be applied to the current global state, from a set of possible events stored in the memory (211,212);
   e) store a record of the selected event in the memory (211, 212);
   f) identify those of the automata affected by the selected event and update the current global state by updating the local states of the affected automata; and
   g) store a record of the updated current global state in the memory (211,212).

20. A testing apparatus as claimed in claim 19, wherein the processor (210) is configured to perform the operations a) to g) sequentially.

21. A testing apparatus as claimed in claim 20, wherein the processor (210) is configured to repeat the operations d) to g) until a termination condition is satisfied.

22. A testing apparatus as claimed in claim 17, wherein the processor (210) is further configured to test the application or system by running the application or system using a test case comprising the records of global states and events stored in memory (211,212).

23. A testing apparatus as claimed in claim 22, including an output unit configured to output the results of the test.

24. A testing apparatus as claimed in claim 23, including an input device configured to allow a user to assist in the preparation of a Stochastic Automata Network based model and the processor being configured to store the model (210) in the memory (211,212) when the preparation of the model is complete.

* * * * *